Sept. 10, 1929.    V. E. LEGG    1,727,550
COMPOSITE CONDUCTOR
Filed Oct. 6, 1926
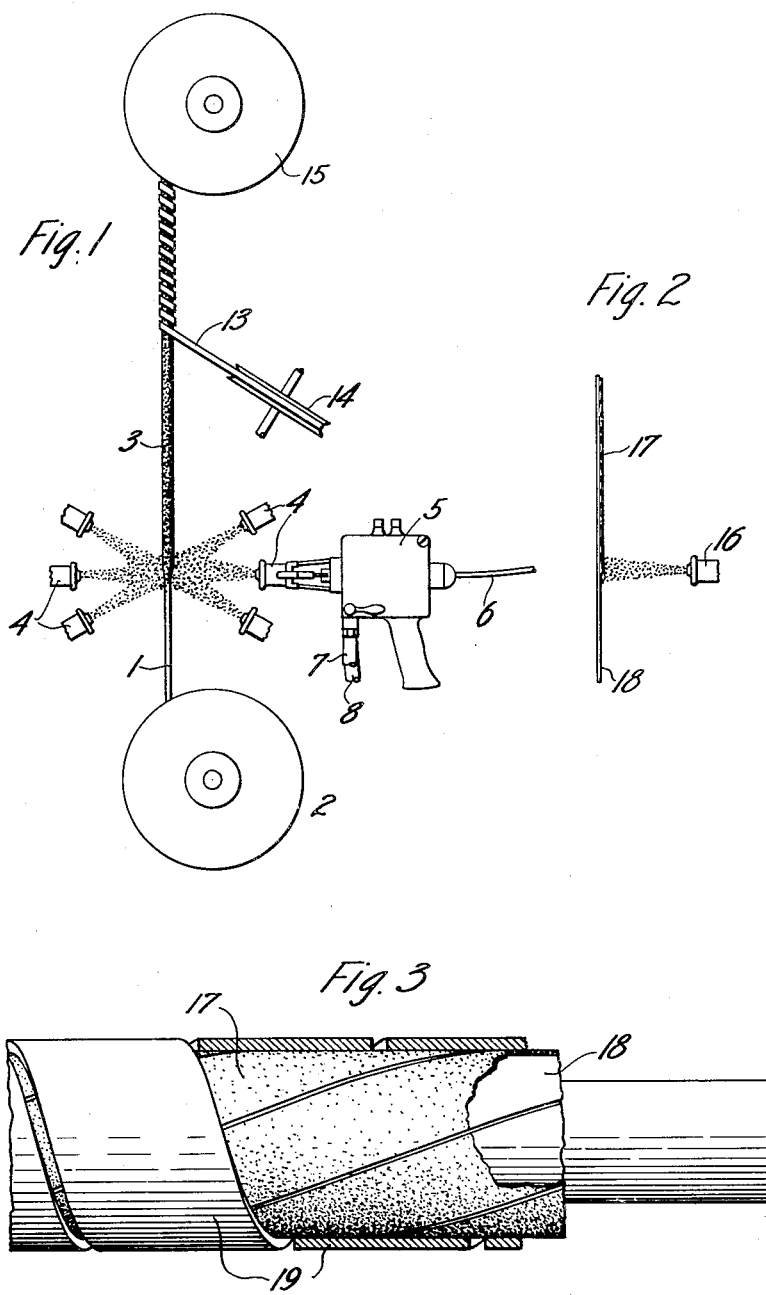
Inventor:
Victor E. Legg,
by E. V. Griggs Attorney Patented Sept. 10, 1929.

1,727,550

UNITED STATES PATENT OFFICE.

VICTOR E. LEGG, OF MONTCLAIR, NEW JERSEY, ASSIGNOR TO BELL TELEPHONE LABORATORIES, INCORPORATED, OF NEW YORK, N. Y., A CORPORATION OF NEW YORK.

COMPOSITE CONDUCTOR.

Application filed October 6, 1926. Serial No. 139,777.

This invention relates to the construction of composite strands and more particularly to the construction of signaling conductors continuously loaded with material having high permeability.

An object of this invention is the production of a composite metallic strand. One example of such a strand is a continuously loaded signaling conductor.

A more specific object of the invention is to so produce a loaded conductor, the loading material of which requires heat treatment when in place on the conductor, as to prevent the loading material from adhering to the conductor in consequence of the heat treatment.

Until comparatively recently, iron has been considered to be the only material suitable for the continuous loading of signaling conductors. It has been discovered, however, that more suitable materials may be produced in the form of alloys. When nickel and iron are alloyed in proper proportions and the alloy is given a proper heat treatment, a material having high permeability at low magnetizing forces is obtained. A preferred composition comprises 78½% nickel and 21½% iron. Another magnetic alloy suitable for loading purposes comprises 45% nickel, 30% iron and 25% cobalt. After a proper heat treatment, the permeability of this alloy at low magnetizing forces shows only small variations with varying flux densities. Other properties possessed by these alloys which increase their value as loading materials are low hysteresis loss and high resistivity, both conducive of increasing the efficiency of the conductor.

When it was attempted to employ these materials either in the form of tape or wire for the continuous loading of a conductor, difficulties were encountered.

Desired qualities of these materials may be brought out by proper heat treatment, but it was found that, when this heat treatment was applied prior to placing the material upon the conductor, at least some of the desired qualities were deleteriously affected due to the mechanical strains incident to the application process; hence the finished conductor is heat-treated.

In order to obtain the high magnetic quality of the nickel-iron and nickel-iron-cobalt alloys it is necessary that they be heat treated at approximately 900° C., after they have been applied to the copper conductor. The primary magnetic quality desired is minimum hysteresis loss.

In the process of heat treating a loaded conductor at about 900° C., the copper expands considerably more than the surrounding loading material and, when there is not sufficient slack in the loading material, very close contact is established between the two either in the furnace or just after the conductor enters the cooling chamber. Contraction of the loading layer is rapid in the latter stage of the heat treatment due to the cooling medium being applied directly to this layer. Due to the increased molecular activity at the elevated temperature of 900° C., diffusion between the two metals appears to be established and welding or adhesion to take place over portions of the contact surfaces. Upon cooling the copper conductor, tends to draw away from the magnetic loading material and since this material partially adheres to the copper stresses are set up, thereby deleteriously affecting properties of the loading material.

Various ways of preventing this adhesion between the conductor and the loading material have been devised heretofore.

In accordance with one embodiment of the present invention, a metallic separator, such as nickel, is applied to the copper conductor prior to the application of the magnetic tape or wire, to prevent adhesion between the different metals of the composite conductor, by applying a thin layer of molten metal to the surface of the conductor. While it is preferable to use nickel for this purpose, the same result may be obtained with other metals, such as iron, manganese, chromium, molybdenum, cobalt or alloys of these metals. In the heat treating process for improving the magnetic qualities of the loading material after its application to the conductor, the temperature is of the order of 900° C. Therefore, any metal having a sufficiently high melting point to prevent sticking or welding of the loading material to the copper conductor or to the metallic separator itself, may be applied to the conductor prior to the application of the loading material to form a suitable metallic separator. The requisites of the metallic separator are that its melting point shall be well above the heat treating temperature, preferably above 1200° C., and that the metallic separator, during the heat treatment yields no deleterious gases to embrittle the copper conductor. Other metals than those mentioned above have melting points above 1200° C., but the metals enumerated are easily obtainable and are inexpensive.

The separating metal is preferably applied to the copper conductor in the form of a thin coating by spraying the metal from a Schoop's pistol. In such a pistol an oxy-acetylene or other flame may be used to fuse the metal which is then projected on the surface to be treated. The magnetic material is applied directly to the metallic coated conductor and heat-treated in the usual manner, to obtain the desired qualities for the magnetic material. The metallic coating is inert at the temperature of the treatment given the magnetic material, so that no welding occurs between these metals and, no stresses are formed in the magnetic material to impair the qualities thereof during the cooling process.

A more detailed description of the invention follows and is illustrated in the accompanying drawing in which Fig. 1 discloses the preferred method of applying the metallic coating to the conductor, Fig. 2 illustrates an alternative method, and Fig. 3 shows a length of a composite conductor with portions in cross-section.

In Fig. 1 the metallic conductor 1 may consist of a single strand or a plurality of strands. The conductor is fed slowly from a supply reel 2 and passes through a region in which the refractory metallic coating 3 is applied. This coating is preferably applied by spraying the fused metal from a plurality of nozzles 4 to form a desired thickness of metallic coating on the conductor 1. A suitable apparatus for spraying the metal, which is preferably nickel, on the conductor, comprises a Schoop's pistol 5, consisting of a casing enclosing a feeding mechanism (not shown) for advancing the metal in the form of a wire 6 to the nozzle 4. Other metals, such as iron, chromium, vanadium, molybdenum, tungsten, or other high melting point metals may be substituted for nickel. The only requisite of the metallic coating is that the melting point of the metal to be sprayed on the conductor should be sufficiently higher than the annealing temperature, which is approximately 900° C., so that welding or sticking will not take place at this temperature. It was found that metals having temperatures above 1200° C., are the most satisfactory and will prevent adhesion during the heat treatment of the conductor. The metallic wire 6 passing through the feeding mechanism of the pistol 5 is fused in an oxy-acetylene or oxy-hydrogen flame, and the molten spray is ejected from the nozzle 4 under pressure of the products of combustion, which are supplied to the pistol by means of the hose lines 7 and 8. The magnetic tape is supplied from a reel 14 and is applied helically to the coated conductor. After the magnetic tape is applied a take-up reel 15 receives the completed conductor. A continuous method of manufacture is carried out by this arrangement, whereby the various operations are performed in sequence.

After the composite conductor has been completed, it may be passed through a tubular furnace, such as is disclosed in a patent to F. S. Kochendorfer, No. 1,624,668 issued on April 4, 1927, to give the composite conductor the necessary heat treatment to improve the magnetic qualities of the magnetic material. During this heat treatment, the refractory metallic coating between the metallic core and the magnetic material prevents adhesion between these metals, and, since the refractory metallic coating is inert at the temperatures of the heat treatment, there is no danger of a welding action taking place between the coating and the magnetic material to cause stresses in the magnetic material.

While the above description discloses the application of a metallic coating on a central core conductor or a stranded conductor, the same result may be attained by applying the metallic coating to a strand or a plurality of strands prior to the winding of the strands on the central core conductor. In Fig. 2 is shown a nozzle 16 through which the molten spray of metal is projected to the flat surface of a copper strand 18. A plurality of these strands are wound on a central core in the manner shown in Fig. 3, the strands 18 having the refractory coating 17 on the outer surface thereof. The magnetic tape 19 is applied to the coated strands the same as in Fig. 1, to form a composite conductor after which the necessary heat treatment may be given to the magnetic tape and increase the permeability thereof without causing adhesion between the adjacent strands.

The invention is equally effective with alloy materials other than nickel-iron and nickel-iron-cobalt alloys and prevents adhesion during heat treatment between the alloy material and adjacent strands of a composite strand. Furthermore, the metal may be applied to the strands or conductor by means other than the Schoop's process mentioned.

What is claimed is:

1. A method of producing a composite metallic conductor free from adhesion between the layers of said conductor, which comprises forming a metallic coating by fusion on one of the layers of said conductor, applying a layer of magnetic material to said coating, and heat treating said composite conductor to improve the electrical and magnetic properties of said magnetic material, said metallic coating being inert at the temperature of the heat treatment.

2. A method of producing a composite metallic conductor free from adhesion between the layers of said conductor, which comprises spraying metal on a layer of said conductor, winding thereon a layer of conducting material having properties different from those of the treated layer, and heat treating said composite conductor.

3. A method of producing a composite metallic conductor free from adhesion between layers of said conductor, which comprises fusing a metal in a flame, projecting the fused metal on the core of the conductor, applying a layer of magnetic material over said metallic coating, and heat treating the composite conductor to improve the magnetic properties of said material.

4. The method of producing a loaded conductor which comprises spraying a layer of metal on a strand, winding said strand about a central core, winding a layer of loading material closely about said treated strand, and subjecting the wound conductor to a heat treatment to improve its electrical characteristics.

5. The method of preventing adhesion between two strands of a composite metallic conductor requiring heat treatment, said method comprising fusing a layer of a high melting point metal on one of said strands to separate it from the other of said strands, the melting point of said metal being higher than the temperature of said heat treatment.

6. The method of preventing adhesion between two strands of a composite metallic conductor which is subject to a temperature of approximately 900° C., said method compising depositing by spraying a layer on one of said strands of a metal having a melting point of at least 1200° C. to separate it from the other of said strands.

7. A composite strand, comprising a plurality of component strands, and a metallic coating fused on at least one of the component strands, the metal of said coating having a melting point higher than that of the metal of said coated strand and separating it from another of said component strands to prevent adhesion therebetween at temperatures approaching the melting point of said coated strand.

8. A composite strand consisting of a plurality of component strands in close contact, and a metallic coating fused on at least one of said component strands, the metal of said coating having a higher melting point than that of any of the component strands and separating said component strand from another of said component strands to prevent adhesion therebetween at temperatures approaching the melting point of one of said component strands.

9. A loaded conductor comprising a core, a layer of metal fused on the surface of said core, and a wrapping of loading material wound closely about said layer, said loaded conductor requiring heat treatment to improve characteristics of said wrapping for loading purposes.

10. A composite conductor comprising a central core, a high melting point metal fused thereon, and a magnetic material applied to said high melting point metal, said conductor being subject to heat treatment to increase the permeability of said material without affecting said fused metal.

11. A loaded conductor comprising a central core, a magnetic material wound thereon, said material being subject to adhesion to said core during heat treatment, and a welded coating of metal on said core separating said magnetic material therefrom.

In witness whereof, I hereunto subscribe my name this 5th day of October, A. D., 1926.

VICTOR E. LEGG.